United States Patent [19]

Ditzler et al.

[11] Patent Number: 4,877,588
[45] Date of Patent: Oct. 31, 1989

[54] METHOD AND APPARATUS FOR GENERATING OZONE BY CORONA DISCHARGE

[75] Inventors: Lee C. Ditzler, Diablo; Ronald F. Lemberger, Danville; Cynthia L. Slezak, Pleasanton, all of Calif.

[73] Assignee: Trineos, Pleasanton, Calif.

[21] Appl. No.: 210,469

[22] Filed: Jun. 17, 1988

[51] Int. Cl.⁴ .............................................. C01B 13/11
[52] U.S. Cl. ............................ 422/186.19; 422/186.07
[58] Field of Search ....................... 422/186.18, 186.19, 422/186.07; 204/176

[56] References Cited

U.S. PATENT DOCUMENTS

| | | | |
|---|---|---|---|
| 1,050,260 | 1/1913 | Walden | 422/186.19 |
| 1,074,462 | 9/1913 | Richards | 422/186.18 |
| 1,130,827 | 3/1915 | Knox | 422/186.19 |
| 3,364,129 | 1/1968 | Cremer et al. | 422/186.19 |
| 3,671,417 | 6/1972 | Louboutin | 422/186.19 |
| 4,216,096 | 8/1980 | Paré et al. | 422/186.19 |
| 4,320,301 | 3/1982 | Kogelschatz | 422/186.18 |
| 4,410,495 | 10/1983 | Bässler et al. | 422/186.18 |
| 4,504,446 | 3/1983 | Kunicki et al. | 422/186.19 |

Primary Examiner—John F. Terapane
Assistant Examiner—Susan Wolffe
Attorney, Agent, or Firm—Townsend and Townsend

[57] ABSTRACT

Ozone is added to captured water by a method and apparatus which involves corona discharge into an oxygen-containing gas in regions in a generator which alternate with regions where the newly formed ozone is cooled. The alternating corona and cooling regions permit the ozone to form without being thermally decomposed as soon as it is formed. Also disclosed is an overall system and method of controlling the level of dissolved ozone in a body of captured water which modulates the output of an ozone generator in accordance with readings of oxidation-reduction potential in the water.

7 Claims, 2 Drawing Sheets

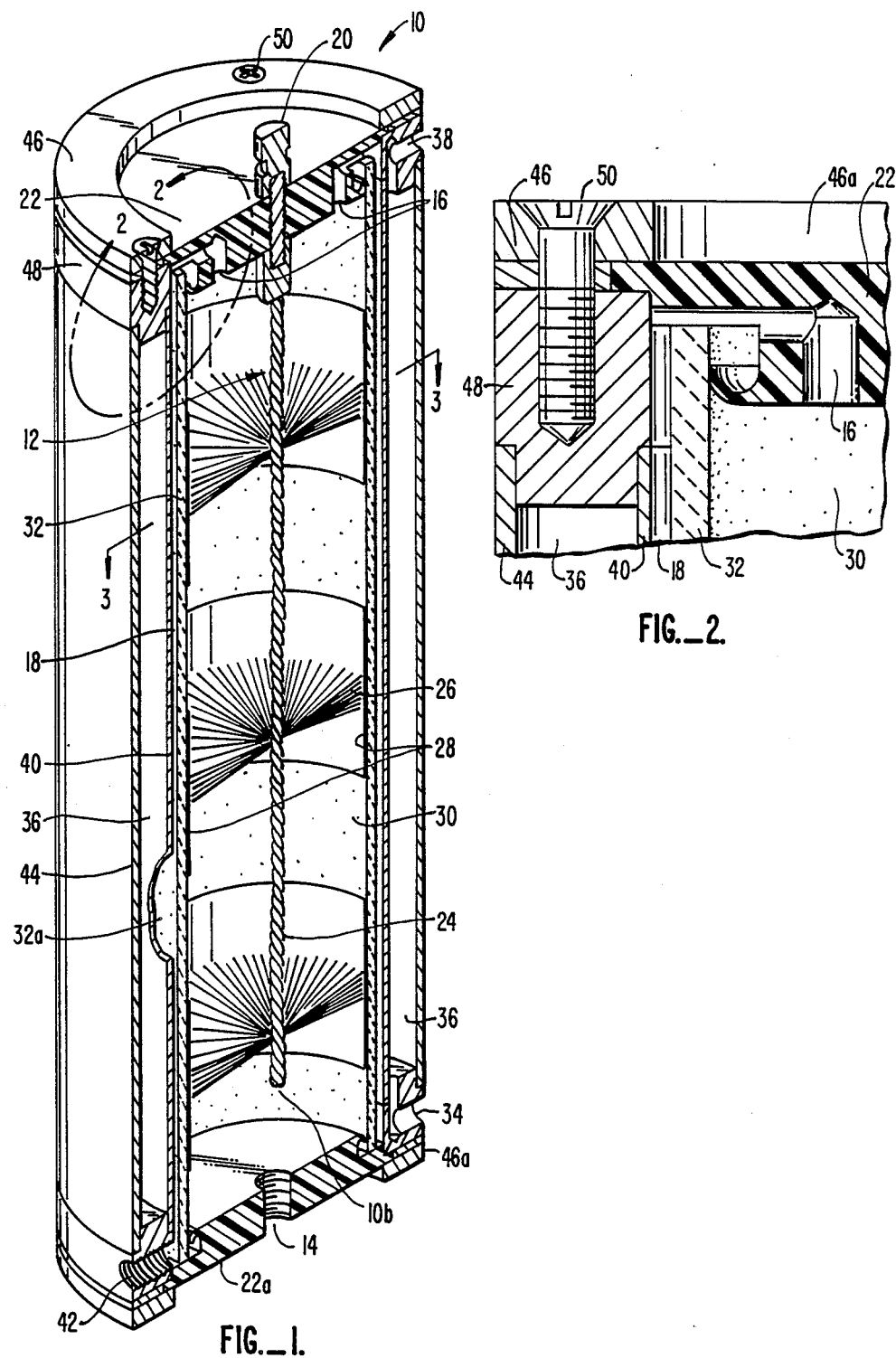

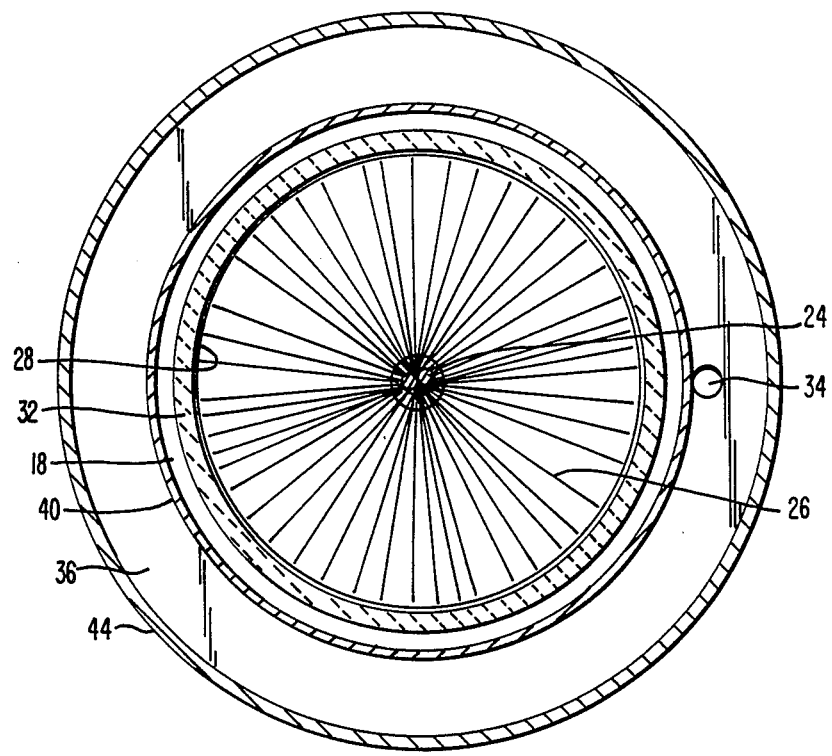
FIG._3.
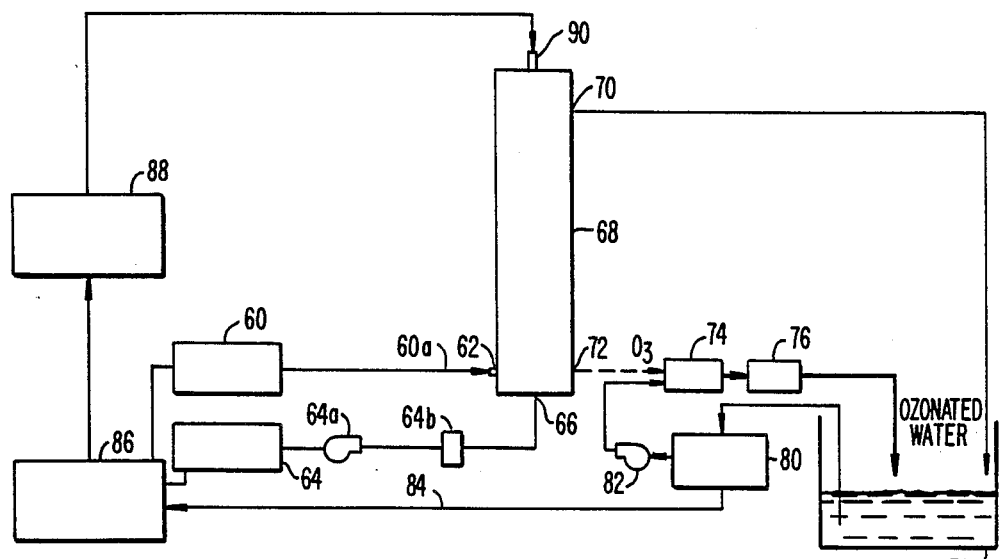
FIG._4.

METHOD AND APPARATUS FOR GENERATING OZONE BY CORONA DISCHARGE

The present invention relates generally to ozone generation. In particular, the invention relates to ozone generation from oxygen by corona discharge.

BACKGROUND OF THE INVENTION

There are severe problems in economically manufacturing ozone at levels up to about ten pounds per day. Conventional corona discharge ozone generation equipment suffers from the disadvantage that extensive feed air pretreatment is required or pure oxygen must be utilized. Also, ozone concentrations much over four percent are not economically obtainable by prior corona discharge technology.

Methods to produce ozone include thermolysis in a plasma above 2760° C. followed by quenching in liquid oxygen; slow oxidation of phosphorus, beta irradiation of oxygen in nuclear reactors; high current electrolysis of aqueous phosphate solutions at room temperature; electron-beam irradiation of air; oxidation of yellow phosphorus in air to phosphorus sesquioxide and a small amount of ozone: UV irradiation of oxygen or air; and corona discharge. Of the above methods, only UV irradiation and corona discharge are of any commercial importance.

Ultraviolet ozone generation technology is frequently used for capacity requirements of under one pound per day; however, such method suffers from the disadvantages of high power consumption and low ozone concentration.

For example, the irradiation of air at 184.9 nm by one UV (40W) bulb can produce about 0.5 g/h of ozone and a 0.25wt % maximum concentration. These maximum ozone yields and concentrations cannot be obtained simultaneously by the method. Ultraviolet ozone generators are used for food preservation, in brewery cellars, and in hotel and hospital air ducts. Thus, the low concentrations of ozone that are available from UV generators preclude them from being used for the treatment of water, because the transfer efficiencies of ozone from the air into water are low and large volumes of feed gas must be handled. More than 44 kW.h are required to generate 1 kg of ozone from dry air by light under high gas-flow rates and low concentrations.

Larger quantities and higher concentrations of ozone dictate the use of corona discharge technology. A corona discharge is a silent electrical discharge which is used to accelerate electrons so as to give them sufficient kinetic energy to split the oxygen-oxygen double bond upon impact with the oxygen molecule. The two oxygen atoms, which are formed from this collision, react with another oxygen molecule to form ozone. The thermodynamics of the ozone synthesis reaction is:

$$3O_2 \rightarrow 2O_3 \quad \Delta H°_f = 144.8 \text{ kJ/mol} \ (34.61 \text{ kcal/mol})$$

Therefore, the formation of 1 kg of ozone requires 3.02 MJ (721 kcal). A typical corona discharge ozone generator requires about 16.5 kW.h of electric energy to produce 1 kg of ozone from air at a 1wt % concentration. Thus, only about 5% of the electric energy which is supplied to the ozone generator is consumed in the generation of ozone. The largest portion of the electric energy appears as heat, and an insignificant amount is liberated as light energy.

Ozone decomposes thermally to oxygen; therefore, an ozone generator must be cooled very efficiently to prevent the generator from operating at elevated temperatures. In the event that heat is not adequately dissipated from the ozone generator, a portion of the ozone which is generated is simultaneously destroyed.

In corona discharge a substantial fraction of the electrical energy is converted to heat. The low volume of gas flowing between the electrodes does not have sufficient capacity to remove this heat. Thus, some external heat sink is necessary, since the decomposition of ozone is accelerated by increasing temperature. An example of a modern plate-type, air-cooled ozone generator is the Lowther cell. In other commercial ozone generators, the ozonated gas is water-cooled. The cooling process of these earlier ozone generators, is inefficient due to their configurations, thereby limiting their ability to convert air or pure oxygen to desirable concentrations.

A process and device for the generation of ozone by electrolytic processes is disclosed in U.S. Pat. No. 4,541,989 (Sept. 17, 1985) to Foller. In this process, oxygen from air is cathodically reduced to an air electrode to form water, which in turn is decomposed to an inert anode to form ozone. U.S. Pat. No. 4,016,060 (Apr. 5, 1977) to Lowther, discloses a method for increasing the electrical efficiency of a corona discharge reaction system. In Lowther, the corona is produced in a gas-filled gap between opposing electrodes by a high voltage, narrow pulse electrical discharge. In U.S. Pat. No. 4,176,061 (Nov. 27, 1979) to Stopka, an apparatus and method for purifying liquids such as water is disclosed. More particularly, U.S. Pat. No. 4,176,061 discloses a gas having a high concentration of ozone provided by a generator comprising a plurality of electrodes connected in a series by gas flow lines. The voltage necessary to cause the corona discharge is applied externally and subject to contact by an operator of the apparatus.

In sum, the currently available commercial ozone generators, particularly those using corona discharge are expensive and lack efficiency in obtaining high concentrations of ozone.

SUMMARY OF THE INVENTION

In one aspect, the present invention provides an apparatus and method for generating ozone using a corona discharge. An efficient ozone generator for converting an oxygen-containing gas to ozone is achieved by cooling the converted gas as it is formed.

In accordance with the present invention, an oxygen-containing gas is passed through a dielectric cylinder, then back over the outside of the cylinder through an annular passage where corona discharge occurs in an alternating manner with cooling through heat exchange. Heat exchange occurs through a thermally conductive wall surrounding the annular passage with a coolant flowing through a second annular passage surrounding the thermally conductive wall. The arrangements of corona regions alternating with cooling regions provides cooling of the oxygen-containing gas prior to and after being subjected to corona discharge. This results in a considerable lessening of the loss of ozone produced by the corona discharge, which otherwise occurs by the heat produced by the discharge itself.

In a second aspect, the present invention provides an apparatus and method for monitoring and adjusting ozone output levels in accordance with oxidation-reduction potential (ORP) measurements in a captured or controlled body of water. The amount of ozone dissolved in the captured water is analyzed for its ORP by a sensor which generates an output signal to a controller. This signal is compared by the controller with a preselected reference point, which then automatically adjusts the amount of voltage supplied by a power supply, in an amount corresponding to the difference between the detected and preselected signal levels, to the ozone generator.

The present invention in both aspects is applicable to a wide range of purification systems, particularly water cooling towers and decorative water displays such as artificial fountains, lakes and waterfalls. Other advantages, aspects, and embodiments of the present invention will be apparent from the following description.

BRIEF DESCRIPTION OF THE DRAWINGS

FIG. 1 is a longitudinal cross-sectional perspective view of an example of an ozone cell generator in accordance with the first aspect of the present invention;

FIG. 2 is an enlarged cross-sectional view along line 2—2 of FIG. 1; and

FIG. 3 is a cross-sectional view along line 3—3 of FIG. 1.

FIG. 4 is a schematic illustration of an example of an ozone output monitoring and controlling system in accordance with the second aspect of the present invention.

DETAILED DESCRIPTION OF THE INVENTION AND PREFERRED EMBODIMENTS

In accordance with the first aspect of the present invention and referring to FIG. 1, an illustrative ozone cell generator is shown generally at 10 and comprises a flow passage 12, defined by a dielectric cylinder 32, which contains a source of electrical energy in the form of a conductor 24 arranged axially.

Oxygen-containing gas is supplied continuously from an external source through gas inlet 14. The gas flows through flow passage 12 and a connecting passage 16 into an annular passage 18.

Electrical energy is supplied through a high voltage connection 20 to the axial conductor 24, and out through radial brushes 26. An end seal 22 encloses the cylinders and provides the connecting passage 16.

The electrified radial brushes 26 contact electrically conductive regions or bands 28 on the interior surface of the dielectric cylinder 32. These bands define corona discharge areas in the annular passage 18 between the dielectric 32 and the intermediate wall 40, which is electrically and thermally conductive.

The corona discharge converts oxygen in the oxygen-containing gas to ozone. As the resulting mixture continues through the annular passage 18, it passes through the corona-free regions 30 in between the corona regions 28. In these corona-free regions 30, the mixture is cooled by heat exchange with coolant in a second annular passage 36 through the heat exchange wall 40. This minimizes decomposition of the newly produced ozone gas in the first annular passage 18.

The coolant, which is preferably water, is delivered to the ozone generator through the coolant inlet 34, through the second annular passage 36, and out through the coolant outlet 38. The final gas mixture containing the ozone is aspirated under pressure from the first annular passage 18, through the gas outlet 42, and into a mixing chamber (not shown).

The outer wall 44 defines the exterior surface of the ozone generator. The generator cell 10 is sealed with the stainless steel flanges 46 and 46a which are positioned over the end seal 22, and fastened to the flange receiver 48 of the ozone cell generator 10 with screws 50.

FIG. 2, which is an enlarged cross-sectional view along line 2—2 of FIG. 1, illustrates more clearly how the ozone generator is sealed and further illustrates the relationship between the corona-free region of the flow passage 12, the dielectric cylinder 32, the first annular passage 18, the heat transfer wall 40, the second annular (coolant) passage 36, and the outer wall 44.

FIG. 3, which is a cross-sectional view along line 3—3 in FIG. 1, illustrates the cylindrical configuration of the ozone generator cell.

In an embodiment found to be particularly effective, power was supplied by a high voltage AC power supply delivering power at 15 KVA at 700 Hz. Dry air was supplied at a pressure of 10 psig at a flow rate of 1 scfm through the cylinder and maintained by an upstream compressor. Moreover, the embodiment comprised the following non-limiting dimensions: external length and diameter were 31.60 inches and 4.00 inches, respectively; outer wall thickness 0.065 inch; second annular passage width 0.45 inch; intermediate wall thickness 0.035 inch; first annular passage width 0.090 inch; and dielectric cylinder length, diameter and thickness were 30.950 inches, 2.750 inches, and 0.125 inch, respectively. The electrically conductive regions (three shown) were 6 inches wide each. The first nonconductive (corona-free) region, nearest the top, was 2 inches wide; the second and third corona-free regions were 5 inches wide each; and the bottom-most corona-free region was 1 inch wide. All electrically conductive structures were made of stainless steel, and the dielectric cylinder was made of ceramic.

The oxygen-containing gas useful in the present invention may be, for example, air or pure oxygen. If air is used as the feed gas, the air must be dry since moisture will result in the undesired formation of nitrogen oxides. The air may be dried, for example, by molecular sieve (pressure swing absorption) having a dew point range from about $-50°$ F. to about $-100°$ F.; preferably, $-100°$ F. Moreover, other factors, such as, for example, refrigeration, increasing the pressure above atmospheric, and increasing the frequency of the discharge will increase the yield of ozone.

The cylinder which forms the inner wall is constructed from dielectric material, such as, for example, glass or ceramic; preferably ceramic. Typically, the dielectric thickness may be as small as 0.1 mm (0.004 inch) and as large 24 mm to 50 mm (0.445 inch to 1.97 inches, respectively); preferably 0.125 inch.

The corona-producing regions or bands on the dielectric may be constructed from electrically conductive materials, such as, for example, stainless steel. These regions can be in the form of thin metal sheets, electrically conductive paint, or any other known means of providing a conductive layer over a dielectric substrate. The corona-free regions are the interior surface of the dielectric cylinder wall itself, i.e., ceramic.

The intermediate heat transfer wall 40 is a second electrode constructed from a material, such as, for example, stainless steel. Since the principle of corona discharge requires one electrode to be grounded, it is preferred that this second electrode is grounded and the electrodes on the interior surface of the inner (dielectric) wall are not. The second electrode is grounded by way of connection to the outer wall which is constructed from, for example, stainless steel, and earth-grounded.

The first annular passage, defined by the dielectric cylinder and the heat transfer wall, is where the air is subjected to corona discharge. This passage may vary widely in gap width, depending on the other system parameters. In most systems, however, a gap width ranging from 1 to 3 mm will provide the best results. A gap width of 2.3 mm (0.090 inch) is particularly effective. The widths of the corona regions and corona-free regions may also vary, with widths ranging from about 2 cm to above 20 cm preferred for both.

The second annular passage, defined by the intermediate and outer walls, is where the coolant passes through at a flow rate ranging from 0.25 gallon per minute to 0.6 gallon per minute; preferably at approximately 0.5 gallon per minute. The coolant flowing through the second annular passage may be a fluid, such as, for example, a gas or liquid, preferably a liquid, and even more preferably water.

In the preferred practice of the invention, the air or oxygen-containing gas is first pushed through the interior of the dielectric cylinder prior to entry into annular space which contains the corona regions. This serves to prevent the dielectric from heating up excessively from the corona discharge. In a convenient arrangement as shown, the air flowing through the dielectric cylinder is countercurrent to the air flowing through the corona passages. Also, the latter is countercurrent to the water (coolant) flow in the outer annulus. With this arrangement, maximum cooling of the ozonated gas is achieved, with a minimum of decomposition of the ozone back to oxygen.

In the embodiment shown, the voltage required to form the ozone discharge is supplied from an external power source to a high voltage connection comprising a conductor axially disposed in the flow passage of the generator. Again, the conductor may be constructed from conventional conducting materials such as, for example, stainless steel. Power from the conductor is supplied to the flow passage through radial brushes extending from the conductor to make contact with the electrodes positioned in the interior surface of the dielectric cylinder.

The phrase "means for producing a corona discharge" is used herein to denote the general elements, configuration, and principle of corona discharge, as understood by those skilled in the relevant art. Modifications of the above elements and configurations, including materials, to maximize the efficiency of the present invention will be apparent to those skilled in the art.

In accordance with the second aspect of the present invention and referring to FIG. 4, a supply of cooling water (i.e., the coolant) 60 is passed through the water inline 60(a), the ozone generator 68 via the coolant inlet 62, and out the ozone generator 68 through the coolant outlet 70.

Simultaneously with the flow of cooling water from the water supply 60 through the ozone generator 68 is the flow of oxygen-containing gas (air) from an air supply 64 pumped through the gas pump 64a, the gas dryer 64b, and the gas inlet 66 of the ozone generator 68. Oxygen in the air is converted to ozone in the ozone generator 68 in accordance with the method described in the first aspect of the present invention.

Initially, the ozone so generated is drawn from the ozone generator 68 and into a static mixer 76 which functions to break up the ozone gas particles into micron-sized bubbles, thereby allowing maximum dissolution of ozone in the water. In preferred embodiments, a venturi 74 is disposed between the ozone generator 68 and the static mixer 76 for the purpose of aspirating the ozone from the ozone generator 68 more efficiently. After the ozone and water are mixed together, the ozonated water leaves the static mixer 76 and dumps back into the water basin 78.

At a different point from where the ozonated water dumps into the water basin 78, water is pumped out of the basin 78, through a sensor 80 by a pump 82, through the venturi 74 and static mixer 76 and back into the basin 78.

The sensor system 80 measures, among other things, the oxidation-reduction potential (ORP) of the water, which corresponds to the amount of ozone dissolved in the water, and transmits a signal through the connection line 84 to a controller 86. The controller 86 receives the signal transmitted by the sensor 80 and compares it with a preselected reference point. The difference between the detected and preselected signal levels is the amount to which the controller 86 automatically adjusts the amount of voltage supplied by the power supply 88 to the high voltage connection 90 in an amount required to maintain the desired ozone concentration and production. Thus, the amount of ozone to be generated by the ozone generator 68 is automatically adjusted by the controller 86 to either produce more, less or no ozone (i.e., shut-down), depending on the ORP measurements previously obtained. This cycle of measuring and adjusting ozone output is repeated at desired intervals.

In preferred embodiments of this aspect of the invention, the cooling water is supplied at conventional supply pressures. The oxygen-containing gas delivered to the ozone generator is atmospheric air. The air is first compressed from about 80 psig to about 100 psig, preferably, 100 psig, by an air compressor (Pneumotive Model HP-1000) then, filtered and dried. The prepared air is then reduced in pressure and supplied to the ozone generator at a pressure ranging from about 0.35 atm to about 1.0 atm; preferably at 0.65 atm. The oxygen-containing gas is partially converted to ozone in the ozone generator and is then introduced into the mixing chamber by means of a venturi. The motive fluid which drives the venturi is the water to be treated with ozone. The mixing chamber contacts the ozone-containing gas with the water by breaking the gas into small bubbles, approximately 5 micron in size, and by providing a reasonable amount of residence time for mixing.

The ORP sensor may be, for example, Innovative Sensors, Inc., Model Booster ORP. The controller, to which the ORP sensor transmits its signal, is a Triox MC-66, and has an on-board modem so that monitoring and controlling of setpoints to, the ozone output levels may be performed over the public phone system.

The power supply is capable of generating a voltage range of 0 V to 25 KV; preferably at 22 KV, and at a frequency of 700 Hz to 800 Hz, to maximize ozone concentrations.

While preferred embodiments have been shown and described, various modifications and substitutions may be made thereto without departing from the spirit and scope of the present invention. Accordingly, it is to be understood that the present invention has been described by way of illustration, and not limitation.

What is claimed is:

1. Apparatus for generating ozone from an oxygen-containing gas:
   an inner cylinder of thermally conductive dielectric material surrounded by an intermediate cylinder of thermally and electrically conductive material to define a first annular space, said intermediate cylinder surrounded by an external cylinder to define a second annular space;
   a passage at one end of said inner cylinder communicating the interior thereof with said first annular space, whereby gas emerging from said inner cylinder is directed into said first annular space to flow therethrough countercurrent to said gas in said inner cylinder;
   a plurality of conductive bands along the interior surface of said dielectric cylinder to define corona discharge regions in said first annular space, said conductive bands spaced apart axially to define corona-free regions therebetween of sufficient axial dimension to permit removal of heat generated in said corona discharge regions by heat exchange through said inner cylinder and said through said intermediate cylinder; and
   means for supplying current to said conductive bands.

2. Apparatus in accordance with claim 1 in which said conductive bands are from about 2 cm to about 20 cm in width, and said corona-free regions are from about 2 cm to about 20 cm in width.

3. Apparatus in accordance with claim 1 in which said first annular space defines a gap between said inner cylinder and said intermediate cylinder of from about 1 mm to about 3 mm.

4. Apparatus in accordance with claim 1 in which said current supplying means comprises an electric cable passing through said inner cylinder and means for transmitting current from said electric cable to said conductive bands while permitting the passage of said oxygen-containing gas therethrough.

5. Apparatus in accordance with claim 4 in which said current transmitting means is a series of circular brushes extending from said electric cable to contact said conductive bands.

6. Apparatus in accordance with claim 4 further comprising means for passing liquid coolant through said second annular space.

7. Apparatus for generating ozone from an oxygen-containing gas:
   an inner cylinder of thermally conductive dielectric material surrounded by an intermediate cylinder of thermally and electrically conductive material with a gap therebetween of from about 1 mm to about 3 mm to define a first annular space, said intermediate cylinder surrounded by an external cylinder to define a second annular space;
   a passage at one end of said inner cylinder communicating the interior thereof with said first annular space, whereby gas emerging from said inner cylinder is directed into said first annular space to flow therethrough countercurrent to said gas in said inner cylinder;
   means for passing liquid coolant through said second annular space;
   a plurality of conductive bands of about 2 cm to about 20 cm in width along the interior surface of said dielectric cylinder to define corona discharge regions in said first annular space, said conductive bands spaced apart axially to define corona-free regions therebetween of sufficient axial dimension ranging from about 2 cm to about 20 cm in width to permit removal of heat generated in said corona discharge regions by heat exchange through said inner cylinder and said through said intermediate cylinder; and
   an electric cable passing through said inner cylinder and a series of circular brushes extending from said electric cable to contact said conductive bands.

* * * * *